Patented Apr. 5, 1927.

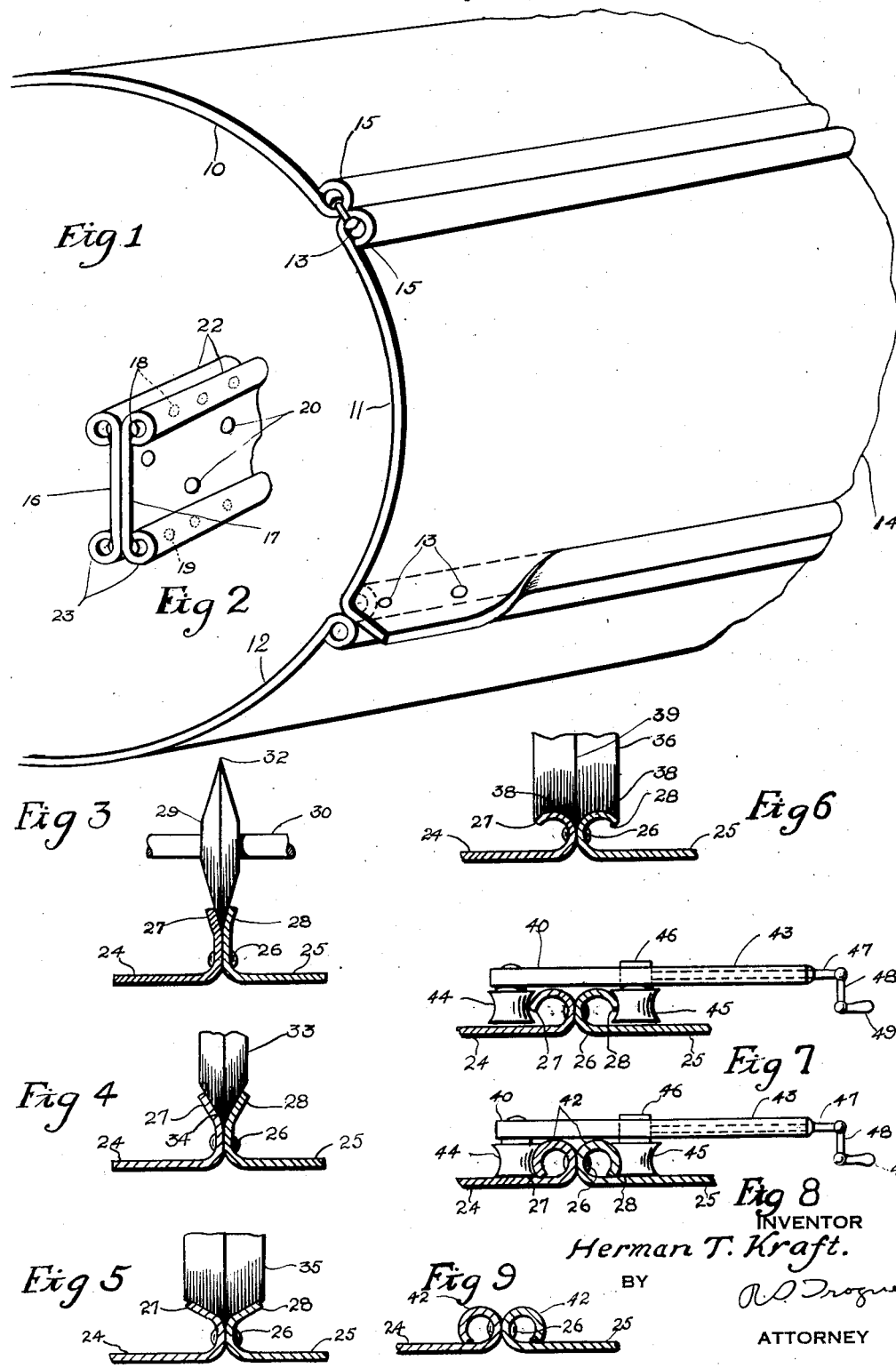

1,623,939

UNITED STATES PATENT OFFICE.

HERMAN T. KRAFT, OF AKRON, OHIO, ASSIGNOR TO THE GOODYEAR TIRE & RUBBER COMPANY, OF AKRON, OHIO, A CORPORATION OF OHIO.

METHOD OF CONSTRUCTING COLUMNS.

Application filed September 21, 1925. Serial No. 57,783.

My invention relates to the manufacture of metal columns or truss members and it has particular relation to a method of manufacturing reinforced structural elements.

One object of my invention is to provide a method of reinforcing metal structural members which are particularly adapted for use in the fabrication of the superstructure of airships, and which are adapted to offer great resistance against tensile, compression or bending stresses.

Another object of my invention is to provide a method of manufacturing structural members for airship superstructure by which method individual interconnected structural elements are reinforced and the connecting means are protected and relieved from stresses to which it would otherwise be subjected.

In the manufacture of metal superstructure adapted to be used in rigid dirigible airships or in other structures in which truss members are employed, such as the fuselage for aeroplanes, it is desirable to obtain the greatest strength possible and, at the same time, employ a relatively small amount of material in order to reduce the weight thereof to a minimum. Heretofore, such structures have been fabricated principally by connecting a great number of relatively small members to relatively long members to form a more or less intricate lattice work. Especially in the construction of airship cars and aeroplane fuselage in which the columns or griders are open longitudinally of their interior, it is desirable to secure the greatest degree of stability at the greatest circumference. In other words, the greatest amount of metal employed should be at the outside of the structure. Truss members or colums constructed in accordance with the method disclosed in my invention render it possible to place reinforcing elements forming a part of the structural members adjacent the outer surface of the column or truss.

My invention consists generally in securing together flat or curved metal plates. The first step consists in securing plates together in such manner that considerable space remains between the connecting means, such as rivets, and the edges of the plate. Subsequently, the edges of the plates are rolled to form tubular members which encase the ends of the securing rivets. By so constructing the truss, the tubular members in reality becomes structural elements, which lend great strength to the structure as a whole. The method of construction herein described also obviates the use of I-beams, and materially reduces the weight of the elements necessary for adequate strength of airship supporting members. It is well known that two plates, when riveted together by conventional methods, provide a construction wherein forces tending to separate the plates are transmitted to the heads of the rivets tending to draw them through the rivet openings. By bending the metal along the lines of riveting, after the rivets have been secured in place, the portion of the metal along this area of bending, contracts on one side and expands on the other. Thus, the contraction of the metal will exert compression forces upon the shanks of the rivets adjacent the heads thereof. This construction will insure a distribution of forces along a portion of the rivet shanks and relieve the rivet heads of a great amount of stress to which they would otherwise be subjected. It is apparent, therefore, that this method of forming riveted joints reduces the likelihood of the structural elements separating along the seam or line of riveting.

For a better understanding of my invention, reference may now be had to the accompanying drawings forming a part of this specification, of which;

Fig. 1 is a fragmentary perspective view of a column or girder constructed in accordance with the method disclosed by my invention;

Fig. 2 is a fragmentary perspective view of another form of girder or beam constructed according to the method disclosed by my invention;

Fig. 3 is a fragmentary view illustrating in detail the primary step involved in practising the method of forming reinforcing elements of a column or girder embodying my invention;

Fig. 4 is a fragmentary view similar to that of Fig. 3, illustrating a subsequent step in the method of forming reinforcing elements;

Fig. 5 is a fragmentary view similar to that of Fig. 3, illustrating a further step in practising the method embodied in my invention;

Fig. 6 is a fragmentary view similar to that shown in Fig. 5, illustrating a subsequent step in practising my invention;

Fig. 7 is a fragmentary view of a column or girder and an elevational view of a tool employed in forming tubular members embodied in my invention;

Fig. 8 is a view similar to that shown in Fig. 7 with the exception that the tool is in an advanced position; and Fig. 9 is a fragmentary end view of the tubular members formed in accordance with the methods disclosed by my invention.

In practising my invention, I provide sheets of metal 10, 11, and 12, preferably of light weight material, such as duralumin. In the form of my invention illustrated in Fig. 1, the plates are curved and are secured together adjacent their edges by means of rivets 13 and they form a substantially cylindrical column 14. It will be observed that the rivets are positioned a short distance from the edges of the plates 10, 11, and 12 and the edges thus formed are rolled back over the heads of the rivets to form tubular members 15 which encase the heads of the rivets. It is well-known that tubular members are inherently strong and the double reinforcing tubular members 15 disposed longitudinally of the column 14 impart great strength thereto.

Another embodiment of my invention, as illustrated in Fig. 2, comprises two flat plates 16 and 17 which are secured together longitudinally thereof by means of two rows of aligned rivets 18 and 19 spaced from the edges of the plates. Additional rivets 20 may be employed, if desirable, in order to more firmly secure the plates together. The portions of the plates between the rows of rivets 18 and 19 and the edges of the plates are rolled back over the rivet heads in order to form oppositely disposed pairs of tubular members 22 and 23, each pair being arranged in tangential relationship to the main body of the plates and encasing the heads of the respective rows of rivets 18 and 19.

The methods of forming the column or girder above described is best illustrated in Figs. 3 to 8. Referring to Fig. 3, two plates 24 and 25 are riveted together, as indicated at 26, along a line spaced from the edges 27 and 28. In order to spread the edges 27 and 28, I provide a disc-shape tool 29 mounted upon a shaft 30 and provided with a sharply tapered edge 32. The sharp edge 32 of this tool is adapted to be inserted between the edges 27 and 28 and the tool is adapted to be rolled along the edge in order to spread them outwardly, as indicated in the drawings.

In Fig. 4, I have illustrated a second step in the method of forming the edges 27 and 28 into tubular members by employing a tool 33 similar to the tool 39, except that it is formed with a rolling edge 34 more blunt than the edge 32. Likewise a somewhat similar tool 35, shown in Fig. 5, constitutes the means for effecting the third step in the method, by which tool the edges 27 and 28 are spread still farther apart.

In order to shape the edges 27 and 28 into curved configuration, incident to the formation of the tubular members, a tool 36 is provided and mounted in the same manner as the tool 29. This tool is provided with circumferential concave surfaces 37 and 38 and a relatively blunt edge 39. By the operation of this tool, the edges 27 and 28 are shaped according to the illustration in Fig. 6.

I have illustrated in Figs. 7 and 8 a tool 40 designed for the purpose of effecting the final steps of rolling the edges 27 and 28 into the form of tubular members 42. This tool comprises a bar 43 having journalled at one end thereof a circumferentially concave roller 44. A similar circumferentially concave roller 45 is journalled upon a block 46 slidable in the member 43. A rod 47 provided with a crank arm 48 and handle 49 is threaded in the bar 43 longitudinally thereof and bears at one end against the block 46. Pressure is applied upon the edges 27 and 28 between the rollers 44 and 45 by turning the crank 48, and, by moving the tool longitudinally of the edges 27 and 28, the latter are formed into tubular members 42 as indicated.

The completed tubular reinforcing members are best shown in Fig. 9. By tubing the edges 27 and 28, the rivets 26 are compressed or subjected to a clamping action because of the contraction on one side of each metal sheet disposed thereabout. Thus the shanks of the rivets 26 are firmly gripped adjacent their heads by the metal of the encasing tubular members 42 and they are capable of withstanding considerable tensional stresses without confining such stresses to the heads thereof.

It will be obvious from the foregoing description, that I have provided a method of forming reinforced structural columns and like members, which provides for relatively inexpensive manufacture thereof, and which method provides for materially strengthening such structures, at the same time reducing the amount of material necessary in the fabrication thereof.

Athough I have illustrated but the preferred forms which my invention may assume and have described those forms in detail, it will be apparent to those skilled in the art that the invention is not so limited but that various minor modifications and changes may be made therein without departing from the spirit of my invention or from the scope of the appended claims.

What I claim is:

1. The method of constructing a girder which comprises riveting together a series of plates adjacent their edges, spreading the edges, and bending such edges back over along the line of riveting to form reinforcing members.

2. The method of forming connecting seams along plate members adjacent their edges which comprises connecting the plates together along a line adjacent the edges of the plates and simultaneously rolling the edges over upon themselves to cover the outer lines of connection.

3. The method of forming reinforced metal members which comprises connecting plates adjacent their edges by means of a row of rivets and forming the edges into tubular members encasing the heads of the rivets.

4. The method of forming a reinforced metal supporting structure which comprises riveting together sheets of metal adjacent their edges and compressing the shanks of the rivets adjacent the heads thereof by bending the edges back upon themselves by means of rollers.

5. The method of shaping contiguous edges of sheet metal plates which comprises connecting the plates adjacent their edges by means of rivets, spreading the edges by means of a roller, and rolling the edges including bending the riveted portion into the form of tubular members encasing the line of riveting.

6. The method of reinforcing contiguous edges of sheet metal plates which comprises riveting the plates together and adjacent their edges bending the edges back upon themselves by means of a roller and subsequently further rolling the edges by means of a plurality of rollers to form tubular members.

In witness whereof, I have hereunto signed my name.

HERMAN T. KRAFT.